Patented Sept. 3, 1940

2,213,204

UNITED STATES PATENT OFFICE 2,213,204

CATALYTIC PRODUCTION OF ARYL-NAPHTHYL AMINES

Paul Whittier Carleton, Penns Grove, N. J., assignor to E. I. du Pont de Nemours & Company, Wilmington, Del., a corporation of Delaware No Drawing. Application June 4, 1938,
Serial No. 211,810

7 Claims. (Cl. 260—576)

This invention relates to secondary aryl naphthylamines, and more particularly to the preparation of such compounds by the condensation of naphthols with primary aryl amines.

It is well known that hydroxy aryl compounds may be condensed with primary aryl amines to produce the corresponding di-aryl amines. In many instances (particularly when the hydroxy aryl compound belongs to the naphthol series) high temperatures must be employed to bring about the reaction. Even then the reaction progresses slowly and the formation of undesirable by-products (by decomposition or further condensation) keeps the yields well below theoretical. The art has expended much time and effort in search of catalyzers which will expedite the reaction and increase the yields.

The catholicity of the condensation is well illustrated by the work of Knoevenagel on iodine as a catalyst (J. Pr. Ch. 2, 89 page 1), wherein the production of a great variety of di-aryl amines is disclosed, and by German Patent 86,150 in which a large number of catalysts for the condensation of hydroxy-anthraquinones with aryl amines is disclosed.

The chief difficulty that has been encountered when catalysts are used is the corrosion of the apparatus. Severe corrosion conditions are encountered when strong mineral acids (or the corresponding acid salt of the amine) are employed. Hydrochloric acid, for example, gives off corrosive fumes when heated. Corrosion is also caused by the moist sulfur dioxide given off by sulfuric acid as the reaction nears completion. In general the most active catalysts have been found to be the most corrosive, and the art has therefore found it necessary to balance these effects.

This invention had for an object the production of secondary aryl naphthylamines by a process which would give good yields without the formation of undesirable by-products and without substantial corrosion of commercial-scale apparatus. Other objects were to effect the condensation of naphthols with amines of the benzene and naphthalene series easily and quickly without decomposition or further condensation. A general advance in the art and other objects which will appear hereinafter are also contemplated.

It has now been found that sulfanilic acids satisfactorily catalyze the condensation of naphthols and primary aryl amines without causing rapid corrosion of the operating equipment. Of this group, sulfanilic, metanilic and naphthionic acids are outstanding in their effects in the production of phenyl-naphthylamines.

In general the process of the invention is carried out by heating a mixture of a naphthol and an aniline under such conditions that water is removed by distillation substantially as rapidly as it is formed.

From the following description and specific examples, in which are disclosed certain embodiments of the invention, as well as details of what is believed to be the best mode for carrying out the invention, it will be apparent how the foregoing objects and related ends are accomplished. The quantities are given in parts by weight throughout the application.

Example I

The preparation of N-phenyl-beta-naphthylamine was carried out by placing 521 parts of aniline (5.6 mols), 400 parts of beta-naphthol (2.8 mols) and 8.5 parts of sulfanilic acid (0.05 mol) in a cast iron kettle equipped for mechanical agitation and having a steel column delivering to a condenser. The order of the addition of the ingredients is immaterial. The mixture was heated with agitation until distillation just commenced (a temperature of 150°–180° C. is usually necessary). The rate of heating was adjusted so that primarily the water formed in the reaction distilled off with only a very small amount of aniline. The heating was continued until the reaction was complete, as shown by the fact that no more water was formed. Five to eight hours heating are usually required, ad the temperature frequently goes as high as 220°–250° C. at the end of the reaction. At the finish of the reaction the product was distilled under diminished pressure to obtain as a first fraction excess (or unreacted) aniline, as a second fraction a very small amount of unreacted beta-naphthol, and finally as a third fraction the N-phenyl-beta-naphthylamine. A yield of 565 parts of a product having a freezing point of 107.6° C. was obtained.

A neutralization with caustic alkali before distillation is necessary with the prior art catalysts such as hydrochloric acid. Opening the equipment containing hot aniline for such a purpose is avoided by this invention. The attendant intermediate cooling is also avoided in the present case. This process is therefore safer, and more economical of time and fuel than those previously known.

Example II

The preparation of N-para-tolyl-beta-naphthylamine was carried out by adding beta-napthtol (200 parts), para-toluidine (300 parts) and naphthionic acid (20 parts) to a stainless steel reaction vessel in the order named. The reaction vessel was equipped for mechanical agitation and had a steel column delivering to a condenser. The mixture was heater with agitation, and after distillation had commenced the rate of heating adjusted so that the water formed in the reaction distilled off with only a very small amount of para-toluidine. The heating was continued until no more water was formed, whereby the completion of the reaction was indicated. The final product was treated with 5 parts of soda ash and immediately fractionally distilled under diminished pressure. After the unreacted para-toluidine and beta-naphthol had distilled off, there remained an excellent yield of N-para-tolyl-beta-naphthylamine of good purity.

Example III

The preparation of N-phenyl-alpha-naphthylamine was carried out by heating a reaction mixture consisting of aniline (518 parts), alpha-naphthol (400 parts) and metanilic acid (20 parts) in the manner described in Example I. The condensation of aniline with alphanaphthol does not proceed as readily as with beta-naphthol, so that a longer period of heating was necessary to complete the reaction.

The proportion of aniline (the amine of Example I) or other aryl amine may be varied over a wide range. In commercial scale operation a proportion of not less than 1.1 mol per mol of beta-naphthol (the naphthol of Example I) is preferred. The amount of aniline used depends mainly upon two factors, the quality of the product and the type of apparatus used. Lowering the proportion of aniline from that given above tends to increase the color of the product, thereby making it less desirable commercially. Increasing the amount of aniline seems to confer no particular advantage chemically. However, in the less efficient types of apparatus, for example, those in which considerable aniline is tied up in the refluxing unit, a greater proportion will be necessary in order that there will be an adequate amount in the reaction vessel to condense with the naphthol.

The small amount of aniline which distills over during the course of the reaction is ordinarily insufficient to saturate the water in the condenser. Considering the limitations upon commercial scale apparatus, it is satisfactory to adopt as an ideal the condition where all of the aniline which has distilled over is dissolved in the water after condensation, in other words, a one phase condensate. Since there is a fairly wide difference in the boiling points of aniline and water, it will be obvious that with critically designed refluxing apparatus the amount of aniline distilling out of the reaction vessel can be reduced to an insignificant quantity.

The sulfanilic acid (the catalyst of Example I) or other aniline sulfonic acid calatysts such as metanilic acid, N-(ethyl benzyl)-aniline sulfonic acid, naphthionic and N-ethyl-ortho-toluidine sulfonic acid may (in commercial scale operation) be varied from a low of about 0.01 mol per mol of beta-naphthol up. The preferred range and the one in which the best results have been obtained is from about 0.02 to about 0.20 mol. No advantage has been found for using quantities of the aryl amine sulfonic acid greater than the upper limit of this range.

Alpha or beta naphthols which contain further substituents such as alkyl or sulfo groups, may be reacted satisfactorily according to the above described procedure. The primary aryl amine, similarly, may contain substituents such as alkyl groups, sulfo groups and halogens. When dihydroxy naphthalene derivatives are used, the condensation may be run so as to effect reaction at one or both hydroxy groups. The aryl amine may contain more than one primary amino group (for example, metatolylene diamine), and one or both may be reacted in the condensation. The reaction works especially well with the primary aryl amines of the benzene and naphthalene series. Amino naphthols may be reacted, though in such cases the condensation may take place at the amino group as well as the hydroxy group.

The reaction may be carried out at ordinary normal atmospheric pressures, or at sub- or super-atmospheric pressures, if desired. The choice of pressure conditions will be governed by such factors as the equipment available, the particular compounds being condensed, and the like. At present no advantage is seen in operating under super-atmospheric pressure other than that caused by the traps in the venting system which may be on the order of 1 or 2 inches of water. It is conceivable that one might wish to place the reactants in an autoclave and close the same and heat for a period of time, for example, 10 to 12 hours, before allowing any venting to take place. Such a practice would not involve pressures of more than 50 to 150 pounds per square inch.

The temperatures employed depend upon the particular compounds being condensed. Aniline is the lowest boiling of the aryl amines most commonly employed, and experience indicates that a temperature of about 150° C. is necessary to secure a commercially acceptable rate of condensation with it. This temperature may, therefore, be taken as a practical minimum for condensation at atmospheric pressures. The temperature of the reaction increases as the degree of completion of the reaction increases. It is desirable that at any stage of the reaction the temperature employed be one at which water is eliminated at a commercial rate. Two hundred and fifty degrees (250°) C. seems to be a commercially practical maximum; however, there may be cases when a temperature of 300° C. or even 350° C. would be advantageous for atmospheric pressure condensation. A temperature range of 175° to 235° C. has been found to be a preferred range of temperature for the more common condensations.

In some instances it may be desirable to carry out the reaction in the presence of inert diluents (solvents or suspension media). The common organic liquids such as xylene, ortho-di-chloro-benzene, and the like would, for economic reasons, ordinarily be used.

The reaction may be run in other types of equipment than that described in the specific examples, as will be apparent to those skilled in the art.

The reaction mass may be worked up in various ways. Particular mention may be made of the procedures wherein the condensation product is crystallized from a solvent such as denatured ethyl alcohol, and wherein the reaction product is extracted with a water solution of an acid (such as hydrochloric acid) to remove excess aniline, followed by a water solution of caustic (sodium hydroxide) to remove any unreacted naphthol. In this extraction procedure the product may sometimes be desirably purified by recrystallization from an organic liquid solvent or by vacuum distillation.

The invention is especially useful for the preparation of secondary aryl naphthylamines which during the past decade have become extremely important as anti-oxidants, anti-checking and anti-flex-cracking agents in rubber.

Great difficulty has been experienced with prior art processes for preparing such compounds, because the condensation agent caused corrosion difficulties. This invention has the distinct advantage over such prior art of practically eliminating corrosion difficulties, a point of great commercial significance. A further advantage is the production in high chemical yield of important chemical compounds and dye intermediates having good purity. A still further advantage of this discovery is that the amount of aniline present can be reduced to almost one-half of that required when hydrochloric acid is used as a catalyst.

As many apparently widely different embodiments of this invention may be made without departing from the spirit and scope thereof, it is to be understood that I do not limit myself to the specific embodiments thereof except as defined in the appended claims.

I claim:

1. The process which comprises heating, in the range 150°–350° C., a naphthol with an amino benzene in the presence of sulfanilic acid.

2. The process of claim 1 when the molar ratio of amino benzene to naphthol is 1.1 to 1.

3. The process of claim 1 when the molar ratio of sulfanilic acid to naphthol is 0.05 to 1.

4. The process of claim 1 when there is more than 0.01 mol of sulfanilic and more than 1.1 mol of amino benzene for each mol of naphthol.

5. The process of claim 1 when the molar amount of sulfanilic acid is in the range 0.02 to 0.20 and the molar amount of amino benzene is greater than 1.1 for each mol of naphthol.

6. The process which comprises heating, in the range 150°–350° C.;

| | Mols |
|---|---|
| Aniline | 5.6 |
| Beta-naphthol | 2.8 |
| Sulfanilic acid | 0.05 | so that the water formed by the condensation of the phenol and the amine is distilled off with not more than a small amount of aniline until no more water is formed.

7. The process which comprises heating naphthol with amino benzene in the presence of 0.02 to 0.20 mol of sulphanilic acid to distill off water, and continuing the heating until no more water is formed.

PAUL WHITTIER CARLETON.